March 17, 1964     H. F. SWIFT     3,125,720
CAPACITOR FAULT INDICATOR INCLUDING RESISTANCE VOLTAGE DIVIDER
Filed July 28, 1960
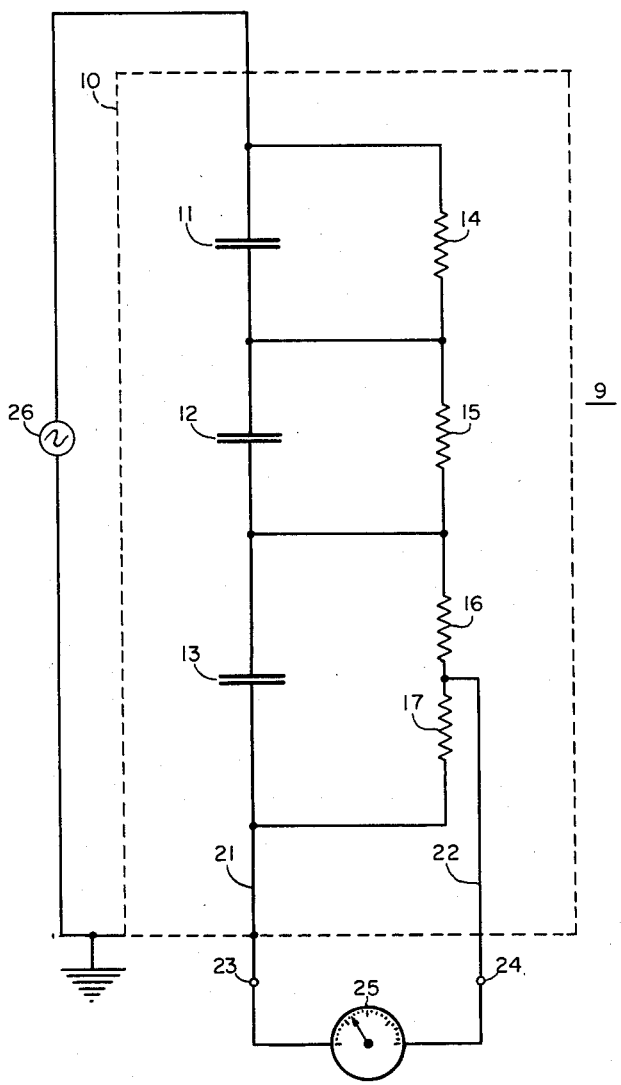
INVENTOR
HALLOCK F. SWIFT
BY
ATTORNEY

United States Patent Office

3,125,720
Patented Mar. 17, 1964

3,125,720
CAPACITOR FAULT INDICATOR INCLUDING
RESISTANCE VOLTAGE DIVIDER
Hallock F. Swift, 302 Livingston Terrace SE.,
Washington, D.C.
Filed July 28, 1960, Ser. No. 46,038
1 Claim. (Cl. 324—51)
(Granted under Title 35, U.S. Code (1952), sec. 266)

The invention described herein may be manufactured and used by or for the Government of the United States of America for governmental purposes without the payment of any royalties thereon or therefor.

The present invention is directed to capacitor fault monitors and more particularly to means for indicating a short circuit in a multi-section capacitor or a number of capacitors connected in series.

Present day operational equipment and research devices require the use of large capacitors, singularly or connected in banks, depending on the capacity of the capacitor and the total capacitance desired. Standard practice for high voltage capacitors is to make the capacitor in several series sections in a casing. It is common knowledge that such capacitors store enough energy so that a short circuit may result in an explosion. Since the capacitors are made in series sections, a short circuit in one section will be temporarily held off by the other sections, and it is a problem to determine that a section has a short circuit. It is more important that a short circuit be detected and corrected as soon as possible to prevent any damage to equipment or in event of an explosion, destruction of equipment or injury to personnel in the vicinity.

Heretofore, capacitors having a faulty section or sections are located by monitoring the liquid dielectric pressure or by measuring the capacitance of the capacitor which changes abruptly due to a short circuit. A capacitor having a section shorting out, arc between the plates, this arcing builds up the pressure of the liquid dielectric which is measured by a pressure valve. This type of monitor requires long periods for detection due to the time required to build-up the pressure in the dielectric. Thus, the time required to detect a short circuit by the pressure method often results in an explosion because of destruction of other elements due to overstress leading to a short circuit in the overstressed sections.

The present invention overcomes the disadvantages of the prior art devices by incorporating means to monitor the voltage across each section within the case. A suitable device is a voltage divider inserted within the casing of a multisection capacitor so that the internal voltages across the capacitor sections can be directly monitored from terminals outside of the casing. The present system permits one to immediately determine the condition of a capacitor by visual or alarm means or by both. This invention is not limited to use with a liquid dielectric type capacitor but can be used with any type capacitor and with a plurality of capacitors connected in a series.

It is therefore an object of the present invention to provide a simple relatively inexpensive and convenient means for determining a faulty capacitor in an electrical circuit.

Yet another object is to provide a system for detecting a short-circuit in a capacitor to prevent an explosion in the capacitor.

Still another object is to provide a system for determining a faulty capacitor which depends on electrical properties of the capacitor.

The nature of this invention as well as other objects and advantages thereof will be readily apparent from consideration of the following specification relating to the annexed drawing in which:

The drawing is of a circuit diagram which represents one suitable faulty capacitor monitor.

It is well known that large capacitors are made in a casing with a plurality of series sections spaced from each other. For the purpose of carrying out the teaching of this invention a resistance voltage divider is connected across the sections with electrical leads across one resistor brought out to outside terminals where a meter or some instrument is connected to measure or indicate the voltage across the voltage divider. The monitor resistor of the voltage divider is chosen such that the voltage across the resistor is a small but known fraction of the charging voltage of the capacitor. The voltage reading of the monitor will have a characteristic value if all components are intact and the reading will change or shift if one or more of the sections obtain a short circuit. When a number of capacitor units are connected together to form a bank, monitor circuitry can be used to compare each capacitor monitor voltage with the average of the rest. In this way, a faulty capacitor can be detected when the voltage across it is at a different value than its rated one, such as arises during electrical charging.

Now referring to the drawing which illustrates one suitable circuit for a capacitor fault monitor, there is shown by illustration a capacitor 9 which includes a capacitor casing 10 shown in dotted line with three capacitor sections 11, 12, and 13 which may be referred to as first, second, and third sections, respectively. Within the casing and across the capacitor sections is located a voltage divider which includes resistors 14, 15, 16 and 17 all connected in series. Resistors 14 and 15 are respectively connected in parallel with the capacitor sections 11 and 12, with resistors 16 and 17 connected in parallel with capacitor section 13. Lead lines 21 and 22 are connected on opposite sides of resistor 17 and brought out to the outside of the casing to suitable contact points 23 and 24 where a suitable monitor such as a voltmeter 25 is connected to measure the voltage through the voltage divider and across resistor 17. The capacitor sections are appropriately connected to a supply source 26 by suitable lead lines.

For illustrative purposes only, the schematic drawing is shown as a three-section capacitor having a total voltage rating of about 21 kv. The resistors 14, 15 and 16 have a value of 100 megohms each and resistor 17 has a value of 1 megohm. A fully charged capacitor will have 21 kv. across the three sections, with the voltage across each capacitor section being 7 kv. such that the voltage across resistors 16 and 17 will be 7 kv., and the voltage across resistors 15, 16 and 17 will be 14 kv., and the voltage across resistors 14, 15, 16 and 17 being 21 kv. Since the resistor 17 has a value one-hundredth the resistance of resistor 16, the voltage across resistor 17 will be approximately 70 volts.

It has been determined that a capacitor or a section of capacitor breaks down during the latter portion of the charging stage or at its maximum charge. From this, a correctly performing capacitor of the above-described illustrated capacitor would have a high voltage of 21 kv. Now if the third section of the capacitor breaks down or shorts out, the total resistance across the capacitor section 13 and resistors 16 and 17 of that section would be effectively zero, thereby cancelling out resistors 16 and 17. Consequently, the voltage reading on the voltmeter would be zero. If either the first or second capacitor section shorts out, then the entire 21 kv. would be across the third section and the good section, so that, the total voltage drop across the resistors 16 and 17 would be 10.5 kv. and the voltage drop across either resistor 14 or 15 would be 10.5 kv. depending on which is the good section. The increased voltage drop across resistors 16 and 17 would increase the voltage reading on the voltmeter to 105 v. and indicate that either section one or section two has a short. No matter which section of the capacitor goes bad, the capacitor must be replaced; therefore, any indication of a bad section is all that is necessary. The important thing is that the faulty indication is made as soon as the fault arises. The voltmeter may be replaced with a light or some type of a sound producing device may also be connected in parallel with the voltmeter for remote indication of a faulty capacitor such as at a panel for observation of a plurality of capacitors. Any suitable means may be connected across the resistor for indicating a faulty capacitor other than those means above described.

In carrying out the teaching of the present invention for detecting a faulty capacitor in a series of capacitors in an electrical circuit, each of the resistors of the voltage divider connected across each of the capacitors should have different values such that different voltage readings on the monitor will represent specific faulty capacitors. The voltage reading can be determined by the voltage applied across the capacitors and the size of the resistors across the capacitors.

The capacitor monitor has been described making reference to the use of a voltage divider connected across the capacitor sections. It is possible in carrying out the teaching of the present invention to place a monitor across each capacitor of a series and each of the monitors can be viewed separately to determine the condition of each of the capacitors. In the use of a capacitor having a casing with several capacitor sections, electrical leads across each of the sections are brought to the outside of the casing and a monitor connected to the leads across each of the sections. Thus each monitor must be watched to determine the condition of the capacitor.

Obviously many modifications and variations of the present invention are possible in the light of the above teachings. It is therefore to be understood that within the scope of the appended claim the invention may be practiced otherwise than as specifically described.

What is claimed is:

1. A faulty-capacitor monitor connected in parallel with a plurality of capacitors connected in series in an electrical circuit which comprises:
   (a) a voltage divider,
   (b) said voltage divider comprising a plurality of resistors connected in series,
   (c) said plurality of resistors connected in series including first and second adjacent series connected resistors of different resistance value located at one end of said plurality of resistors connected in series,
   (d) said first and second adjacent series connected resistors having a total combined resistance value which total resistance is equal to the resistance value of each separate remaining resistor of said plurality of resistors connected in series,
   (e) said second resistor having a resistance value of about 1/100 the value of said first resistor of said first and second adjacent series connected resistors,
   (f) said first and second adjacent series connected resistors connected electrically in parallel with an end capacitor of said plurality of capacitors connected in series in said electrical circuit,
   (g) each of said separate remaining resistors of said plurality of resistors connected in series being connected electrically in parallel with one each of said plurality of capacitors connected in series,
   (h) and a detector connected electrically across said second resistor whereby said detector detects any voltage change across said capacitors to indicate a faulty capacitor.

References Cited in the file of this patent

UNITED STATES PATENTS

| | | |
|---|---|---|
| 2,344,261 | Mortlock | Mar. 14, 1944 |
| 2,449,817 | Nordell | Sept. 21, 1948 |
| 2,478,414 | Michal | Aug. 9, 1949 |
| 2,614,152 | Herborn | Oct. 14, 1952 |
| 3,041,501 | Willits | June 26, 1962 |

FOREIGN PATENTS

| | | |
|---|---|---|
| 913,284 | France | May 27, 1946 |
| 1,067,566 | France | Jan. 27, 1954 |
| 396,640 | Great Britain | printed 1933 |

OTHER REFERENCES

The Weston Electronic Analyzer, Weston Engineering Notes, December 1947, vol. 2, No. 6, pp. 7 and 8.

The Series Capacitor and the High-Voltage Line, article in the Westinghouse Engineer, September 1951, vol. 11, Issue 5, pp. 138–143.